Figure 1:
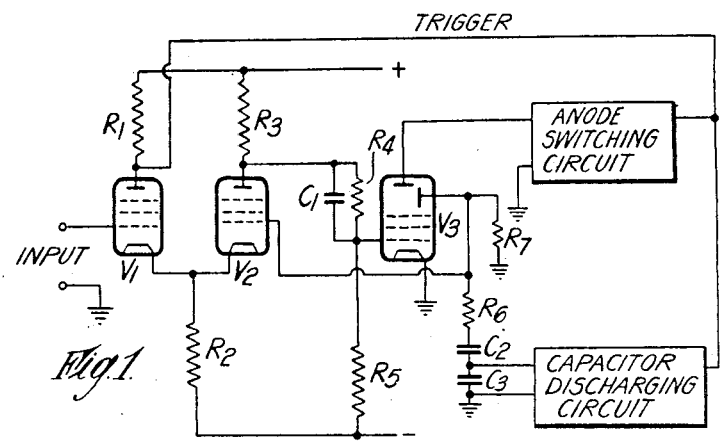

July 19, 1960 M. O. DEIGHTON 2,946,013
VOLTAGE MEASURING CIRCUITS
Filed July 11, 1957

MICHAEL OLIVER DEIGHTON
Inventor

Attorneys

United States Patent Office 2,946,013
Patented July 19, 1960

2,946,013

VOLTAGE MEASURING CIRCUITS

Michael Oliver Deighton, Goring Heath, England, assignor to The United Kingdom Atomic Energy Authority of Patents Branch, London, England Filed July 11, 1957, Ser. No. 671,348

Claims priority, application Great Britain July 13, 1956

2 Claims. (Cl. 328—151)

This invention relates to voltage measuring circuits and relates particularly to voltage measuring circuits for measuring the amplitudes of voltage pulses of short duration.

The principle of operation of some such circuits is to cause the incoming voltage pulse to charge a capacitor to the peak voltage of the pulse. This voltage is stored across the capacitor while its amplitude is compared with a known voltage. Known arrangements operating according to this principle employ one circuit to charge the capacitor to the peak voltage of the input pulse and a further circuit to detect when the voltage across the capacitor is equal to the known voltage. A disadvantage of such arrangements is that voltage drifts, caused for example by variations in contact potentials, occur independently in the two circuits, and the errors in measurement resulting therefrom may be additive and therefore quite large, of the order of 200 mv. In applications where such an arrangement is used to provide a multichannel pulse amplitude analyser, this means that, since to achieve good accuracy the width of each channel must be much greater than the possible drift, the amplitude of the input pulses may have to be inconveniently large.

In the present invention the charging of the capacitor and the measurement of the voltage are performed by the same circuit operating in two different ways. Long-term drifts affect only the level at which the measurement is performed, not the accuracy of the measurement itself.

A voltage measuring circuit according to the present invention comprises an amplifier, a feedback connection for said amplifier, switch means for changing the sign of the feedback in said connection and a capacitor, the arrangement being such that the amplifier charges the capacitor to substantially the peak voltage of an input pulse when the feedback is switched to negative, and detects when the voltage on said capacitor has been reduced to substantially its initial value in a controlled manner when the feedback is switched to positive.

The amplifier may conveniently comprise a "long-tailed pair" in cascade with a secondary emission pentode, the feedback connection may be between the dynode of said pentode and the long-tailed pair, and the switch means may operate to control the anode voltage of said pentode so that the phase of the dynode output is reversed.

The capacitor may be connected between the dynode of said pentode and an earth or neutral point.

The switch means may be triggered by a signal derived from the long-tailed pair.

The capacitor may be discharged in a controlled manner by feeding a known current into a second large capacitor in series with said capacitor.

Figure 2:
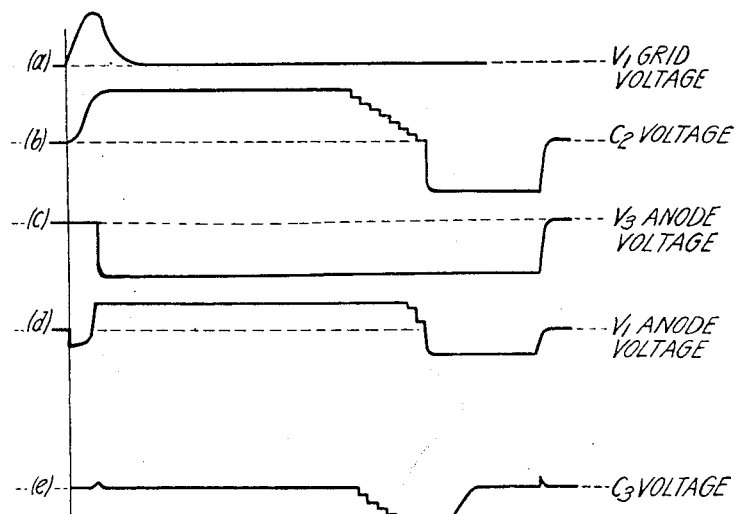
Figure 3:
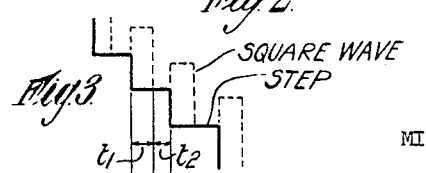

To enable the nature of the invention to be more readily understood, attention is directed to the accompanying drawings, wherein Fig. 1 is a circuit diagram of one embodiment of the invention, Fig. 2 illustrates waveforms at various points in the circuit of Fig. 1, Fig. 3 illustrates a further waveform.

In the diagram of Fig. 1 valves $V_1$ and $V_2$, with a common cathode resistor $R_2$ and anode resistors $R_1$ and $R_3$, from a long-tailed pair or differential amplifier. The anode of $V_2$ is D.C. coupled to the grid of a secondary emission pentode $V_3$ by a potentiometer formed by resistances $R_4$ and $R_5$. A capacitor $C_1$ is included to improve the transient response of the D.C. coupling. Valve $V_3$, which has its cathode grounded, has its dynode connected back to the control grid of $V_2$. The dynode is also connected to ground through resistance $R_7$ and, via resistance $R_6$, to capacitors $C_2$ and $C_3$ in series, capacitor $C_3$ having one side grounded. Capacitor $C_3$ is about 100 times the capacity of $C_2$ and is provided to facilitate the discharging arrangements, as described hereinafter. The anode of $V_3$ is connected to an Anode Switching Circuit (shown in block schematic form) which is triggered from the anode of $V_1$, and a Capacitor Discharging Circuit (shown in block schematic form) also triggered from the anode of $V_1$ is connected across $C_3$.

The long-tailed pair $V_1$ and $V_2$ in series with the secondary emission pentode $V_3$ constitute an amplifying loop. The feedback from the dynode of $V_3$ to the grid of $V_2$ may be made either negative or positive, depending on the anode voltage of $V_3$.

The output from the anode of $V_2$ is applied to the control grid of $V_3$. The resulting dynode current charges capacitors $C_2$ and $C_3$ in series via $R_6$, and since the dynode is connected to the grid of $V_2$, the voltage on this grid is substantially the same as that across $C_2$ and $C_3$. (Resistor $R_6$ is of low value and is included to improve the transient response of the circuit.) A small steady current of about $1\mu A$, determined by $R_7$ is drawn from the dynode to determine the quiescent condition of the circuit.

During the quiescent state and the charging process the anode of $V_3$ is held at its normal recommended operating potential and the negative feedback round the loop, combined with the unidirectional flow of dynode current in $V_3$, results in the voltage on $C_2$ (Fig. 2b) closely following any rising input potential at the control grid of $V_1$ (Fig. 2a). Thus a positive pulse at the input results in the voltage on $C_2$ rising to a value very nearly equal to the peak of the pulse. On the trailing edge of the pulse $V_1$ cuts off and brings $V_2$ into full conduction. Thus $V_3$ cuts off and leaves the peak voltage of the pulse stored on $C_2$, the time-constant $C_2R_7$ being large. It will be seen that the completion of the charging process is marked by a rise in the anode voltage of $V_1$ (Fig. 2d), which may be used to initiate the subsequent action.

To measure the amplitude of the stored voltage, a switching circuit triggered from $V_1$ anode first drops the anode voltage of $V_3$ by an amount sufficient to inhibit collection of secondary electrons by the dynode. The dynode therefore simply collects the primary space current of the valve, no secondary emission is apparent, and the dynode assumes the role of an anode. Owing to the reversal of the direction of dynode current in the external circuit, it follows that the system $V_1$, $V_2$, $V_3$ now comprises a positive feedback loop which is capable of a rapid trigger action as soon as the grids of $V_1$ and $V_2$ come sufficiently close together in potential to bring $V_3$ into conduction. The voltage on $C_2$ is now reduced in a controlled manner appropriate to the type of voltage measurement desired, as is hereinafter explained, the instant at which the circuit triggers supplying the necessary information as to pulse amplitude. This triggering action can be readily detected, as the dynode falls very rapidly by several tens of volts.

The circuit is well adapted for use where the amplitude is measured in terms of a variable time delay. In the example illustrated in Fig. 1 the voltage on $C_2$ may be reduced in steps (Fig. 2d) by a sequence of short current pulses applied to $C_3$ by the Capacitor Discharging Circuit, the pulses approximating to a series of discrete charges. The charges are applied to $C_3$ rather than directly to $C_2$ since $C_2$ may in practice be inconveniently small and therefore require extremely small charge increments per step, which are difficult to control accurately. The number of steps occurring before the circuit triggers is a measure (in quantized form) of the input pulse amplitude; and this number can be counted directly or, in the case of a multi-channel pulse amplitude analyser, used to operate a sequential gating system for routing a "count" pulse to the appropriate address in a storage system. Alternatively $C_3$ may be discharged linearly, the triggering voltage being indicated by the number of pulses produced by an oscillator which is started at the beginning of the linear discharge and stopped when the circuit triggers.

During the measuring process the voltage across $C_2$ remains substantially constant. The action of the Capacitor Discharging Circuit is actually to charge $C_3$ negatively, so that the lower plate of $C_2$ falls in potential, bringing the upper plate down with it. (The voltage across $C_2$ falls slowly with the time-constant $C_2R_7$, but in practice a subsidiary circuit (not shown) may be arranged to feed a small additional current into $C_3$ which compensates for this drop.)

Before the circuit can accept a further pulse for storage and measurement, the voltages on $C_2$ and $C_3$ must be restored to their initial conditions. The voltage on $C_3$ is first restored by a circuit (not shown) whose action is initiated by the triggering action of the loop (Fig. 2e); the subsequent switching of the anode of $V_3$ to its normal voltage results in the loop resuming its negative feedback characteristic, which raises the dynode voltage, and hence the voltage on $C_2$, to its normal quiescent value.

In the simple step discharging process described above, the amplitude of the voltage stored on $C_2$ may be such that the triggering action of the loop tends to take place on the flat part of a step rather than on the vertical edge. This leads to a time uncertainty in the triggering action with respect to the input pulses which may be a disadvantage in pulse amplitude analyser applications. The triggering action may be made more positive by superimposing a square wave on the step waveform to give the resultant waveform shown in Fig. 3. Triggering can only take place during the defined period $t_2$, not during the period $t_1$.

The circuit may be used as a simple form of single-channel analyser by applying a combination of two negative pulses to $C_3$, the first being of large amplitude E and the second a short pulse of height $\Delta E$ beginning a little later. The occurrence of a time coincidence between this short pulse and the triggering of the charging circuit then indicates an input pulse between E and $E+\Delta E$.

A feature of the arrangement is the substantial freedom from drift, due to changes in grid/cathode contact potential in the valves, which is achieved by using the same circuit for charging and for sensing the end point of the discharge process. For example a drift in the grid potentials of $V_1$ and $V_2$ can cause $C_2$ to charge to a slightly higher potential than previously. In this case, however, the circuit will trigger on the discharge at a correspondingly higher voltage on $C_2$. The apparent input pulse amplitude will therefore not change; all that happens is that the voltage waveform on $C_2$ (Fig. 2b) moves bodily up by a small amount equivalent to the drift in relative contact potentials of $V_1$ and $V_2$. The only drifts that can manifest themselves are those occurring during the relatively short period between the peak of the input pulse and the end of the discharge process.

To achieve greater accuracy the common cathode resistor $R_2$ may be replaced by a "constant current" pentode.

I claim:

1. A voltage measuring circuit comprising a differential amplifier connected in cascade with a secondary emission pentode having a dynode, a capacitor connected between said dynode and a neutral point, a feedback connection between said capacitor and said differential amplifier and means for switching the anode voltage of said pentode between a voltage above and a voltage below that of said dynode to control the sign of said feedback, the arrangement being such that said capacitor is charged to substantially the peak voltage of an input pulse to said differential amplifier with the feedback made negative, and the circuit detects when the voltage on said capacitor has been reduced to substantially its initial value in a controlled manner with said feedback made positive.

2. A circuit as claimed in claim 1 wherein a second larger capacitor is connected in series with said capacitor between said capacitor and said neutral point, whereby the voltage on said capacitor is reduced in a controlled manner by feeding a known current into said second capacitor.

References Cited in the file of this patent

UNITED STATES PATENTS

| | | |
|---|---|---|
| 2,468,687 | Schmitt | Apr. 26, 1949 |
| 2,803,748 | Kalibjian et al. | Aug. 20, 1957 |